(12) United States Patent
Honda et al.

(10) Patent No.: US 8,741,441 B2
(45) Date of Patent: Jun. 3, 2014

(54) INSULATED WIRE

(75) Inventors: Yuki Honda, Hitachi (JP); Tomiya Abe, Hitachi (JP); Hideyuki Kikuchi, Hitachi (JP); Daisuke Hino, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 276 days.

(21) Appl. No.: 12/829,528

(22) Filed: Jul. 2, 2010

(65) Prior Publication Data

US 2011/0127067 A1 Jun. 2, 2011

(30) Foreign Application Priority Data

Nov. 30, 2009 (JP) ................. 2009-272515

(51) Int. Cl.
*B32B 15/08* (2006.01)
*C08L 79/08* (2006.01)
*H01B 17/60* (2006.01)

(52) U.S. Cl.
USPC .............. 428/458; 174/137 A; 174/137 B; 428/473.5

(58) Field of Classification Search
USPC ............ 428/458, 473.5; 174/137 A, 137 B
See application file for complete search history.

(56) References Cited

U.S. PATENT DOCUMENTS

| | | | |
|---|---|---|---|
| 5,393,612 A * | 2/1995 | Matsuura et al. | 428/458 |
| 6,252,010 B1 * | 6/2001 | Takeuchi et al. | 525/403 |
| 6,811,875 B2 | 11/2004 | Kikuchi et al. | |
| 8,193,451 B2 * | 6/2012 | Kikuchi et al. | 174/110 R |
| 2003/0232144 A1 | 12/2003 | Kikuchi et al. | |
| 2006/0240255 A1 | 10/2006 | Kikuchi et al. | |
| 2009/0176961 A1 | 7/2009 | Kikuchi et al. | |

FOREIGN PATENT DOCUMENTS

| | | | |
|---|---|---|---|
| JP | 03-181511 | * | 8/1991 |
| JP | 06196025 A | | 7/1994 |
| JP | 07045130 A | | 2/1995 |
| JP | 2000-235818 | * | 8/2000 |
| JP | 2001-307557 | | 11/2001 |
| JP | 2005041966 A | | 2/2005 |
| JP | 2005-203334 | | 7/2005 |
| JP | 2006-302835 | | 11/2006 |
| JP | 2008280504 A | | 11/2008 |
| JP | 2009161683 A | | 7/2009 |

OTHER PUBLICATIONS

Japanese Office Action dated Oct. 1, 2013 issued in Japanese Patent Application No. 2009-272515 together with an English translation.

* cited by examiner

*Primary Examiner* — Ana Woodward
(74) *Attorney, Agent, or Firm* — Scully, Scott, Murphy & Presser, P.C.

(57) ABSTRACT

An insulated wire includes a conductor, and an insulating covering layer formed on a periphery of the conductor and including two or more insulating coatings. The insulating coatings include a polyamide-imide resin insulating material represented by chemical formula 1:

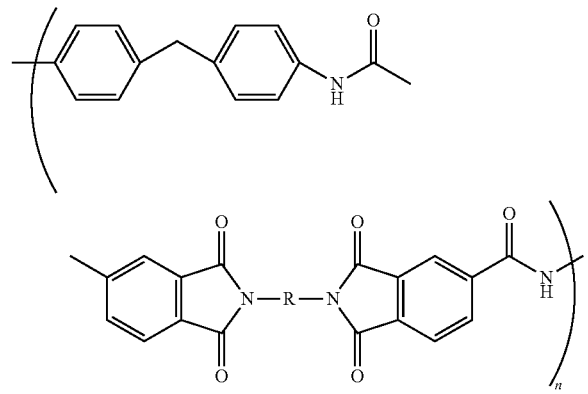

where R indicates a divalent aromatic diamine including three or more aromatic rings. The insulating coatings are formed by applying and baking the polyamide-imide resin insulating material, and the polyamide-imide resin insulating material is obtained by reacting an imide group containing dicarboxylic acid with a diisocyanate, the imide group containing dicarboxylic acid being obtained by dehydration reaction of a diamine comprising a divalent aromatic diamine including three or more aromatic rings with an acid using an azeotropic solvent.

8 Claims, No Drawings

INSULATED WIRE

The present application is based on Japanese Patent Application No. 2009-272515 filed on Nov. 30, 2009, the entire contents of which are incorporated herein by reference.

BACKGROUND OF THE INVENTION

1. Field of the Invention

The invention relates to an insulated wire used for a coil of electrical equipments such as rotating equipment or electric transformer, in particular, to an insulated wire in which an insulating covering layer is formed by an insulating coating made of polyamide-imide resin insulating material.

2. Description of the Related Art

In general, an insulated wire (enamel wire) provided with an insulating covering layer composed of one or two or more insulating coatings obtained by applying and baking an insulating material, in which resin such as polyimide, polyamide-imide or polyester-imide is dissolved in an organic solvent, on a periphery of a metal conductor (a conductor) having a cross-sectional shape consistent with or conforming to an intended use or shape of the coil (e.g., having a circular or rectangular shape) is broadly used for a coil of electrical equipments such as rotating equipment or electric transformer.

Inverter control has been used to drive the electrical equipments such as rotating equipment or electric transformer, and in such electrical equipments using the inverter control, when inverter surge voltage generated by the inverter control is high, the generated inverter surge voltage could enter the electrical equipments. When the inverter surge voltage enters the electrical equipments, partial discharge may occur in an insulated wire composing the coil of the electrical equipments due to the inverter surge voltage, which may lead to deterioration of or damage to the insulating coating.

A method of preventing such deterioration of the insulating coating caused by the inverter surge voltage (deterioration of the insulating coating caused by the partial discharge) is known in which a lifetime of the insulating coating against the partial discharge is improved (surge resistance is improved) by using an insulated wire having an insulating coating formed by applying and baking an insulating material, which is obtained by dispersing, e.g., organosilica sol in resin solution made of polyamide-imide resin, etc., (a partial-discharge-resistant insulating material), on a conductor to prevent the insulating coating from deteriorating or being damaged even though the partial discharge occurs (e.g., see JP-A-2006-302835 and JP-B-3496636).

In addition, another method of preventing deterioration of the insulating coating caused by the inverter surge voltage is known in which an insulated wire is provided with an insulating covering layer having, e.g., an insulating coating formed on a conductor and an extruded covering layer formed thereon and made of polyphenylene sulfide (PPS) in order to increase partial discharge inception voltage, thereby preventing the occurrence of the partial discharge in the insulated wire (e.g., see JP-B-4177295).

In recent years, a hybrid vehicle, etc., has been becoming popular in the context of energy conservation, etc., and the electrical equipment used for such application is controlled by an inverter at voltage higher than a conventional art since a compact size and high voltage driving are desired in order to improve fuel consumption and engine performance of the hybrid vehicle, etc.

In addition, in recent years, it is further required to improve a space rate of an insulated wire to a motor for further downsizing and high-efficiency of the electrical equipment controlled by the inverter, thus, the partial discharge is becoming more likely to occur in the insulated wire than in the conventional art.

Therefore, the latest insulated wire is required to have partial discharge inception voltage higher than the conventional art (e.g., partial discharge inception voltage of 970V or more) in order to prevent the occurrence of the partial discharge, however, an insulated wire described in JP-A-2006-302835 and JP-B-3496636, in which an insulating covering layer provided on a conductor is composed of only an insulating coating formed by applying and baking an insulating material, does not have the high partial discharge inception voltage as described above, hence, resistance against the partial discharge may be insufficient.

On the other hand, in JP-B-4177295, although it is possible to provide the partial discharge inception voltage higher than the conventional art as described above by providing an extruded covering layer made of PPS, etc., on the insulating coating, it is necessary to provide an insulating coating in order to impart adhesion between the conductor and the extruded covering layer. Therefore, when the insulating coating and the extruded covering layer are formed, different fabrication processes, at least a painting process for forming an insulating coating and an extrusion process for forming an extruded covering layer, are required. Thus, since it takes time and effort because of multiple fabrication processes and it is necessary to form the extruded covering layer having a different property on the insulating coating, there is a problem that complicated operations and conditions, etc., are required for fabrication, which accordingly leads to an increase in cost.

SUMMARY OF THE INVENTION

Therefore, it is an object of the invention to provide an insulated wire that has a high partial discharge inception voltage even though an insulating covering layer provided on a conductor is composed of only an insulating coating.

(1) According to one embodiment of the invention, an insulated wire comprises:

a conductor; and an insulating covering layer formed on a periphery of the conductor and comprising two or more insulating coatings, wherein the insulating coatings comprise a polyamide-imide resin insulating material represented by chemical formula 1:

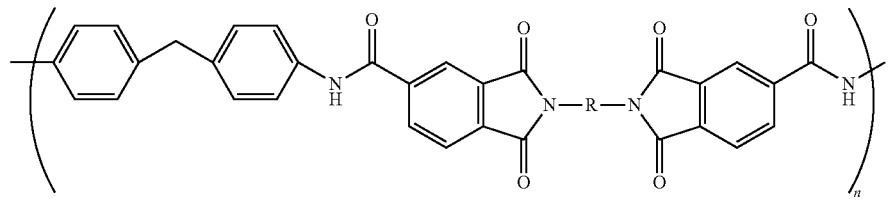

where R indicates a divalent aromatic diamine including three or more aromatic rings, wherein the insulating coatings are formed by applying and baking the polyamide-imide resin insulating material, and wherein the polyamide-imide resin insulating material is obtained by reacting an imide group containing dicarboxylic acid with a diisocyanate, the imide group containing dicarboxylic acid being obtained by dehydration reaction of a diamine comprising a divalent aromatic diamine including three or more aromatic rings with an acid using an azeotropic solvent.

In the above embodiment (1) of the invention, the following modifications and changes can be made.

(i) The insulating covering layer comprises a first insulating coating comprising a polyamide-imide resin insulating material represented by chemical formula 2:

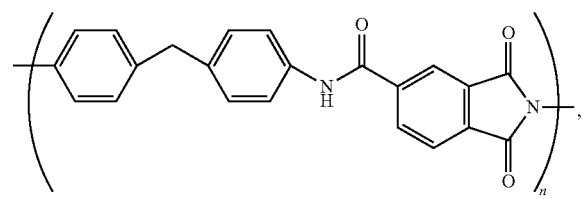

and a second insulating coating comprising the polyamide-imide resin insulating material represented by the chemical formula 1 and formed on a periphery of the first insulating coating, wherein the first insulating coating is formed by applying and baking the polyamide-imide resin insulating material represented by the chemical formula 2, and the second insulating coating is formed by applying and baking the polyamide-imide resin insulating material represented by the chemical formula 1.

(ii) The divalent aromatic diamine including three or more aromatic rings comprises at least one of 2,2-bis[4-(4-aminophenoxy)phenyl]propane, bis[4-(4-aminophenoxy)phenyl]sulfone, bis[4-(4-aminophenoxy)phenyl]ether, 9,9-bis-(4-aminophenyl)fluorene, 4,4'-bis(4-aminophenoxy)biphenyl, and 1,4-bis(4-aminophenoxy)benzene.

(iii) The diisocyanate comprises at least one of an aromatic diisocyanate, an aliphatic diisocyanate, and an alicyclic diisocyanate that the aromatic diisocyanate is hydrogenated.

(iv) The insulated wire further comprises a lubricating insulating coating on a periphery of the second insulating coating.

POINTS OF THE INVENTION

According to one embodiment of the invention, an insulated wire is provided by forming a first insulating coating by applying on the conductor and baking the polyamide-imide resin insulating material represented by the above chemical formula 2, which provides good adhesion to the conductor and excellent heat resistance or abrasion resistance. In addition, when a second insulating coating is formed on a periphery of the first insulating coating by applying and baking the polyamide-imide resin insulating material represented by the above chemical formula 1, which provides high partial discharge inception voltage, the insulated wire can be high in partial discharge inception voltage and excellent in adhesion to the conductor and in flexibility after an elongation of 30%, etc.

DETAILED DESCRIPTION OF THE PREFERRED EMBODIMENTS

An insulated wire in a preferred embodiment of the invention will be described below.

The insulated wire in the embodiment of the invention is comprised of a conductor and an insulating covering layer comprising two or more insulating coatings formed on a periphery of the conductor.

Chemical formula 3

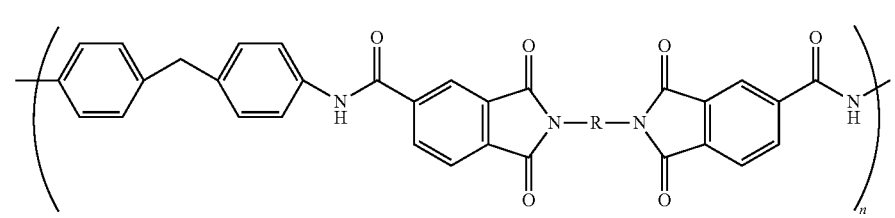

where R indicates the divalent aromatic diamines including three or more aromatic rings.

The insulating covering layer has an insulating coating formed by applying and baking a polyamide-imide resin insulating material represented by the above chemical formula 3, and it is thereby possible to obtain partial discharge inception voltage higher than the conventional wire.

At this time, a single or multiple insulating coatings composing the insulating covering layer other than the insulating coating made of the polyamide-imide resin insulating material represented by the above chemical formula 3 are provided by applying and baking an insulating material, which is formed by dissolving resin such as, e.g., polyimide, polyamide-imide, polyester imide or class H polyester in an organic solvent, directly on the conductor or on the insulating coating made of the polyimide-imide resin insulating material represented by the above chemical formula 3.

Chemical formula 4

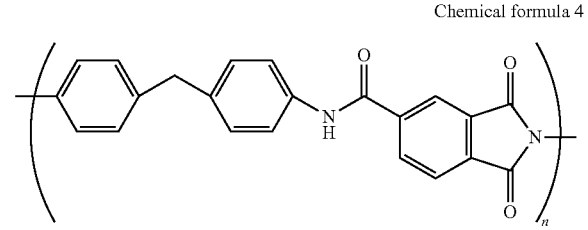

Specifically, it is possible to obtain an insulated wire having excellent adhesion to the conductor and flexibility as well as high partial discharge inception voltage by forming a first insulating coating by applying on the conductor and baking the polyamide-imide resin insulating material represented by the above chemical formula 4, which has good adhesion to the conductor and is excellent in characteristics such as heat resistance or abrasion resistance. In addition, when a second insulating coating is formed on a periphery of the first insulating coating by applying and baking the polyamide-imide resin insulating material represented by the above chemical formula 3, the insulated wire can be high in partial discharge inception voltage and excellent in adhesion to the conductor and in flexibility after an elongation of 30%, etc.

The film thickness is preferably 10 μm or less for the first insulating coating and 30 μm or more for the second insulating coating. When the film thickness of the first insulating coating is more than 10 μm, it is difficult to form the insulation coating having high partial discharge inception voltage even though it is excellent in the characteristics such as heat resistance or abrasion resistance. Meanwhile, when the first insulating coating is not formed, although a dielectric constant of the insulating coating is lower than the case of having only the first insulating coating, the characteristics such as heat resistance or abrasion resistance are largely deteriorated and flaws or voids could occur on a surface of the insulating covering layer when, e.g., winding a wire at the time of forming a coil. In addition, when the film thickness of the second insulating coating is less than 30 μm, it is difficult to form the insulation coating having high partial discharge inception voltage. There is concern that the partial discharge inception voltage of the insulating covering layer is decreased due to such flaws or voids occurred on the surface of the insulating covering layer.

The conductor of the invention is formed of a copper conductor, and oxygen-free copper or low-oxygen copper is mainly used therefor. In this regard, the copper conductor is not limited thereto, and it is possible to use a conductor in which metal plating such as nickel is applied to an outer periphery of copper. In addition, it is possible to use a conductor of which cross-sectional shape is circular or rectangular.

In the invention, the polyamide-imide resin insulating material represented by the above chemical formula 4 can be synthesized by the well-known method such as an isocyanate method or an acid chloride method by reacting mainly two components, e.g., 4,4'-diphenylmethane diisocyanate (4,4'-MDI) or 2,4'-diphenylmethane diisocyanate (2,4'-MDI) or 4,4'-diphenyl ether diisocyanate as a diisocyanate component with trimellitic anhydride (TMA) as an acid component. It is preferable to use the isocyanate method from the viewpoint of manufacturing productivity.

In the invention, the polyamide-imide resin insulating material represented by the above chemical formula 3 is formed by decarboxylation reaction of imide group containing dicarboxylic acid with the diisocyanate component. The imide group containing dicarboxylic acid is obtained by dehydration ring closure reaction of a diamine component made of divalent aromatic diamines having three or more aromatic rings with an acid component made of trimellitic anhydride, etc., using an azeotropic solvent.

In the invention, the divalent aromatic diamines having three or more aromatic rings is used as a diamine component, and the dehydration ring closure reaction of the diamine component and an acid component is carried out using the azeotropic solvent, thus, an abundance ratio of amide group to imide group in polymer, which mostly affect an increase in the dielectric constant of the polyamide-imide resin, is decreased in order to reduce the dielectric constant, and it is thereby possible to achieve the excellent polyamide-imide resin insulating material in which the dielectric constant is reduced without deteriorating the heat resistance, etc.

The divalent aromatic diamines having three or more aromatic rings is made of at least one selected from, e.g., 2,2-bis[4-(4-aminophenoxy)phenyl]propane, bis[4-(4-aminophenoxy)phenyl]sulfone, bis[4-(4-aminophenoxy)phenyl]ether, 9,9-bis(4-aminophenyl)fluorene, 4,4'-bis(4-aminophenoxy)biphenyl or 1,4-bis(4-aminophenoxy)benzene, or an isomer thereof. Alternatively, it is possible to use phosgene based on the aromatic diamines by replacing all or a part of the above listed aromatic diamines with diisocyanates.

Aromatic diisocyanates such as, e.g., 4,4'-diphenylmethane diisocyanate (MDI), 2,2-bis[4-(4-isocyanatephenoxy)phenyl]propane (BIPP), tolylene diisocyanate (TDI), naphthalene diisocyanate, xylylene diisocyanate, biphenyl diisocyanate, diphenyl sulfone diisocyanate or diphenyl ether diisocyanate, and an isomer or a polymer thereof are exemplified as the diisocyanate component. Alternatively, aliphatic diisocyanates such as hexamethylene diisocyanate, isophorone diisocyanate, dicyclohexylmethane diisocyanate or xylene diisocyanate, or alicyclic diisocyanates to which the above exemplified aliphatic diisocyanate is hydrogenated and an isomer may be used or combined, if required.

As for the acid component, there is TMA (trimellitic anhydride) as tricarboxylic acid anhydride. Although, besides the above, it is possible to use aromatic tricarboxylic acid anhydride such as benzophenone tricarboxylic acid anhydride, TMA is the most preferable.

Meanwhile, the azeotropic solvent, which is used to react the diamine component with the acid component, includes aromatic hydrocarbon such as, e.g., toluene, benzene, xylene or ethyl benzene, and xylene is especially preferable. In addition, the reaction temperature for the reaction of the diamine component with the acid component is 160° C.-200° C., preferably, 170° C.-190° C. The reaction temperature for the reaction of the imide group containing dicarboxylic acid with the diisocyanate component is 110° C.-130° C.

For synthesizing the polyamide-imide resin insulating material made of polyamide-imide resins represented by the above chemical formulas 3 and 4, a reaction catalyst such as amines, imidazoles or imidazolines may be used, which desirably does not disturb stability of the coating material. A sealant such as alcohol may be used when a synthesis reaction is suspended.

As a solvent for manufacturing the polyamide-imide resin insulating material composing the first and second insulating coatings, it is possible to use a solvent of which main solvent is a polar solvent such as NMP (N-methyl-2-pyrrolidone). Besides NMP which is the main solvent, a solvent not disturbing the synthesis reaction of the polyamide-imide resin, such as γ-butyrolactone or DMAC (N—N-dimethylacetamide), DMF (N—N-dimethylformamide), DMI (dimethylimidazolidinone), cyclohexanone or methylcyclohexanone may be used concurrently for synthesis or dilution. In addition, aromatic alkyl benzene may be used concurrently for dilution. In this regard, however, the potential decrease in the solubility of the polyamide-imide resin insulating material needs to be considered.

In the invention, an aliphatic structure material may be used concurrently if required since effects of reduction in dielectric constant and improvement in transparency of resin composition are expected, however, since it may lead to deterioration of the heat resistance, it is necessary to take a blending amount or a chemical structure into consideration. The preferable chemical structure not causing deterioration of heat resistance includes linear hydrocarbon and an alicyclic structure, preferably with 6 or less of aliphatic carbon atoms.

In the typical polyamide-imide resin insulating material using MDI and TMA, although MDI is synthesized with the substantially equal amount of TMA, the diisocyanate component may be excessively synthesized in a range of 1-1.05.

A blending ratio of MDI in the invention is not specifically limited, however, the amount of the imide group containing dicarboxylic acid synthesized at the first stage is desirably equal to that of the diisocyanate component. Alternatively, the slightly excessive diisocyanate component may be blended in the manner as the first stage.

The first insulating coating is formed by applying and baking the polyamide-imide resin insulating material made of, e.g., the polyamide-imide resin represented by the above chemical formula 4 on an outer periphery of the conductor, and the second insulating coating is subsequently formed by applying and baking the polyamide-imide resin insulating material made of the polyamide-imide resin represented by the above chemical formula 3 on the outer periphery of the first insulating coating, which results in that the insulating covering layer is formed. Alternatively, the second insulating coating made of the polyamide-imide resin insulating material represented by the above chemical formula 4 may be formed on the outer periphery of the first insulating coating after forming the first insulating coating on the outer periphery of the conductor by applying and baking the polyamide-imide resin insulating material represented by the above chemical formula 3.

The lower the relative dielectric constant of the insulating covering layer the more desirable it is, and 3.0 or less is desirable in order to effectively increase the partial discharge inception voltage.

In order to impart lubricity to the insulated wire, lubricant may be applied or a lubricating coating material may be applied and baked on the uppermost layer, or, antifriction, e.g., hard paraffin, low-molecular polyethylene, fatty acid ester based wax or silicon resin, etc., alone or blended in the insulating covering layer may be applied and baked on the conductor.

In addition, a single or multiple organic insulating coatings formed by applying and baking an insulating material which is formed by dissolving resin such as polyimide, polyamide-imide, polyester imide or class H polyester in the organic solvent may be provided between the first and second insulating coatings.

EXAMPLES

The first and second insulating coatings of the invention were prepared as follows.

(1) Method for the Synthesis of the Polyamide-Imide Resin Insulating Material A (Insulating Material A)

4,4'-diphenylmethane diisocyanate as a diisocyanate component, trimellitic anhydride as an acid component and N-methyl-2-pyrrolidone, N,N-dimethylformamide as a solvent were introduced into a flask provided with a stirrer, a reflux cooling tube, a nitrogen inlet tube and a thermometer, were then heated to 140° C. for about 1 hour while stirring in a nitrogen atmosphere, and were reacted at this temperature for 2 hours in order to obtain a polyamide-imide resin solution with a viscosity of 2300 Pa·s measured by an E-type viscometer, thereby making the polyamide-imide resin insulating material A.

(2) Method for the Synthesis of the Polyamide-Imide Resin Insulating Material B (Insulating Material B)

451.1 g of 2,2-bis[4-(4-aminophenoxy)phenyl]propane which is the divalent aromatic diamines having three or more aromatic rings as a diamine component and 453.9 g of trimellitic anhydride as an acid component were blended in a reactor provided with a stirrer, a reflux cooling tube, a nitrogen inlet tube and a thermometer, 2542.1 g of N-methyl-2-pyrrolidone as a solvent and 254.2 g of xylene as an azeotropic solvent were added thereto and the reaction was subsequently carried out at a stirring revolution of 180 rpm, at a nitrogen flow rate of 1 L/min and at an inside system temperature of 180° C. for 4 hours. The water and xylene produced during the dehydration ring closure reaction once accumulated in a receiver, and were appropriately distilled away from the system.

After cooling to 90° C., 319.7 g of 4,4'-diphenylmethane diisocyanate (MDI) was blended as a diisocyanate component and the reaction was carried out at the stirring revolution of 150 rpm, at the nitrogen flow rate of 0.1 L/min and at the inside system temperature of 120° C. for 1 hour. Subsequently, 89.3 g of benzyl alcohol and 635.4 g of N,N-dimethylformamide were blended and the termination reaction was carried out.

The polyamide-imide resin insulating material B with a viscosity of 2000 Pa·s measured by the E-type viscometer was obtained.

(3) Method for the Synthesis of the Polyamide-Imide Resin Insulating Material C (Insulating Material C)

321.6 g of 1,3-bis(4-aminophenoxy)benzene which is the divalent aromatic diamines having three or more aromatic rings as a diamine component and 453.9 g of trimellitic anhydride as an acid component were blended in a reactor provided with a stirrer, a reflux cooling tube, a nitrogen inlet tube and a thermometer, 2542.1 g of N-methyl-2-pyrrolidone as a solvent and 254.2 g of xylene as an azeotropic solvent were added thereto and the reaction was subsequently carried out at the stirring revolution of 180 rpm, at the nitrogen flow rate of 1 L/min and at the inside system temperature of 180° C. for 4 hours. The water and xylene produced during the dehydration ring closure reaction once accumulated in a receiver, and were appropriately distilled away from the system.

After cooling to 90° C., 319.7 g of 4,4'-diphenylmethane diisocyanate (MDI) was blended as a diisocyanate component and the reaction was carried out at the stirring revolution of 150 rpm, at the nitrogen flow rate of 0.1 L/min and at the inside system temperature of 120° C. for 30 minutes. Subsequently, 89.3 g of benzyl alcohol and 635.4 g of N,N-dimethylformamide were blended and the termination reaction was carried out.

The polyamide-imide resin insulating material C with a viscosity of 2300 Pa·s measured by the E-type viscometer was obtained.

(4) Method for the Synthesis of the Polyamide-Imide Resin Insulating Material D (Insulating Material D)

220.0 g of 3,4'-diaminodiphenyl ether which is the divalent aromatic diamines having three or more aromatic rings as a diamine component and 453.9 g of trimellitic anhydride as an acid component were blended in a reactor provided with a stirrer, a reflux cooling tube, a nitrogen inlet tube and a thermometer, 2542.1 g of N-methyl-2-pyrrolidone as a solvent and 254.2 g of xylene as an azeotropic solvent were added thereto and the reaction was subsequently carried out at the stirring revolution of 180 rpm, at the nitrogen flow rate of 1 L/min and at the inside system temperature of 180° C. for 4 hours. The water and xylene produced during the dehydration ring closure reaction once accumulated in a receiver, and were appropriately distilled away from the system.

After cooling to 90° C., 319.7 g of 4,4'-diphenylmethane diisocyanate (MDI) was blended and the reaction was carried out at the stirring revolution of 150 rpm, at the nitrogen flow rate of 0.1 L/min and at the inside system temperature of 120° C. for 30 minutes. Subsequently, 89.3 g of benzyl alcohol and 635.4 g of N,N-dimethylformamide were blended and the termination reaction was carried out.

The polyamide-imide resin insulating material D with a viscosity of 2600 Pa·s measured by the E-type viscometer was obtained.

Examples and Comparative Examples of the insulated wire made by applying and baking the above prepared polyamide-imide resin insulating materials A to D will be explained in conjunction with Table 1.

The insulating covering layers of Examples 1-6 and Comparative Example 5 are composed of two layers, i.e., the first and second insulating coatings.

On the other hand, the insulating covering layers of Comparative Examples 1-4 are composed of single insulating coating.

Examples 1-6 and Comparative Examples 1-5 will be individually explained below.

Example 1

A 5 μm thick first insulating coating was formed by applying and baking the polyamide-imide resin insulating material A on an outer periphery of a conductor with a diameter of φ 0.8 mm, and subsequently, a 35 μm thick second insulating coating was further formed by applying and baking the polya-

TABLE 1

| | Items | Example 1 | Example 2 | Example 3 | Example 4 | Example 5 | Example 6 |
|---|---|---|---|---|---|---|---|
| Structure of insulated wire | Second insulating coating | Polyamide-imide resin B | Polyamide-imide resin B | Polyamide-imide resin C | Polyamide-imide resin C | Polyamide-imide resin A | Polyamide-imide resin A |
| | (Film thickness) | 35 μm | 30 μm | 35 μm | 30 μm | 10 μm | 5 μm |
| | First insulating coating | Polyamide-imide resin A | Polyamide-imide resin A | Polyamide-imide resin A | Polyamide-imide resin A | Polyamide-imide resin B | Polyamide-imide resin B |
| | (Film thickness) | 5 μm | 10 μm | 5 μm | 10 μm | 30 μm | 35 μm |
| Relative dielectric constant | | 2.82 | 2.86 | 2.82 | 2.90 | 3.00 | 3.00 |
| Partial discharge inception voltage (Vp) | | 996 | 980 | 992 | 975 | 970 | 970 |
| BDV (kV) | | 19.8 | 19.2 | 19.0 | 18.6 | 18.4 | 18.6 |
| Flexibility (no elongation) | | 1d | 1d | 1d | 1d | 1d | 1d |
| Flexibility (30% elongation) | | 1d | 2d | 2d | 2d | 3d | 3d |
| Reciprocating abrasion (Number of times) | | 1520 | 1550 | 1480 | 1470 | 523 | 638 |
| Twist Test (Number of times) | | 132 | 130 | 130 | 131 | 105 | 101 |
| Adhesion (Number of times) | | 81 | 79 | 81 | 72 | 62 | 62 |
| Softening temperature (° C.) | | 455 | 462 | 460 | 461 | 408 | 421 |

| | Items | Comparative Example 1 | Comparative Example 2 | Comparative Example 3 | Comparative Example 4 | Comparative Example 5 |
|---|---|---|---|---|---|---|
| Structure of insulated wire | Second insulating coating | Polyamide-imide resin A | Polyamide-imide resin B | Polyamide-imide resin C | Polyamide-imide resin D | Polyamide-imide resin D |
| | (Film thickness) | 40 μm | 40 μm | 40 μm | 40 μm | 35 μm |
| | First insulating coating | | | | | Polyamide-imide resin A |
| | (Film thickness) | | | | | 5 μm |
| Relative dielectric constant | | 3.50 | 3.15 | 3.22 | 3.25 | 3.10 |
| Partial discharge inception voltage (Vp) | | 900 | 965 | 950 | 945 | 960 |
| BDV (kV) | | 18.0 | 18.6 | 17.5 | 18.0 | 18.8 |
| Flexibility (no elongation) | | 1d | 1d | 1d | 1d | 1d |
| Flexibility (30% elongation) | | 5d | 3d | 3d | 4d | 3d |
| Reciprocating abrasion (Number of times) | | 1600 | 750 | 860 | 980 | 1100 |
| Twist Test (Number of times) | | 110 | 131 | 125 | 130 | 135 |
| Adhesion (Number of times) | | 78 | 72 | 75 | 79 | 79 |
| Softening temperature (° C.) | | 460 | 361 | 380 | 395 | 480 | mide-imide resin insulating material B, thereby making an insulated wire composed of an insulating covering layer having a total thickness of 40 μm.

Example 2

A 10 μm thick first insulating coating was formed by applying and baking the polyamide-imide resin insulating material A on an outer periphery of a conductor with a diameter of φ 0.8 mm, and subsequently, a 30 μm thick second insulating coating was further formed by applying and baking the polyamide-imide resin insulating material B, thereby making an insulated wire composed of an insulating covering layer having a total thickness of 40 μm.

Example 3

A 5 μm thick first insulating coating was formed by applying and baking the polyamide-imide resin insulating material A on an outer periphery of a conductor with a diameter of φ 0.8 mm, and subsequently, a 35 μm thick second insulating coating was further formed by applying and baking the polyamide-imide resin insulating material C, thereby making an insulated wire composed of an insulating covering layer having a total thickness of 40 μm.

Example 4

A 10 μm thick first insulating coating was formed by applying and baking the polyamide-imide resin insulating material A on an outer periphery of a conductor with a diameter of φ 0.8 mm, and subsequently, a 30 μm thick second insulating coating was further formed by applying and baking the polyamide-imide resin insulating material C, thereby making an insulated wire composed of an insulating covering layer having a total thickness of 40 μm.

Example 5

A 30 μm thick first insulating coating was formed by applying and baking the polyamide-imide resin insulating material B on an outer periphery of a conductor with a diameter of φ 0.8 mm, and subsequently, a 10 μm thick second insulating coating was further formed by applying and baking the polyamide-imide resin insulating material A, thereby making an insulated wire composed of an insulating covering layer having a total thickness of 40 μm.

Example 6

A 35 μm thick first insulating coating was formed by applying and baking the polyamide-imide resin insulating material B on an outer periphery of a conductor with a diameter of φ 0.8 mm, and subsequently, a 5 μm thick second insulating coating was further formed by applying and baking the polyamide-imide resin insulating material A, thereby making an insulated wire composed of an insulating covering layer having a total thickness of 40 μm.

Comparative Example 1

The polyamide-imide resin insulating material A was applied and baked on an outer periphery of a conductor with a diameter of φ 0.8 mm, thereby making an insulated wire composed of an insulating covering layer having a thickness of 40 μm.

Comparative Example 2

The polyamide-imide resin insulating material B was applied and baked on an outer periphery of a conductor with a diameter of φ 0.8 mm, thereby making an insulated wire composed of an insulating covering layer having a thickness of 40 μm.

Comparative Example 3

The polyamide-imide resin insulating material C was applied and baked on an outer periphery of a conductor with a diameter of φ 0.8 mm, thereby making an insulated wire composed of an insulating covering layer having a thickness of 40 μm.

Comparative Example 4

The polyamide-imide resin insulating material D was applied and baked on an outer periphery of a conductor with a diameter of φ 0.8 mm, thereby making an insulated wire composed of an insulating covering layer having a thickness of 40 μm.

Comparative Example 5

A 5 μm thick first insulating coating was formed by applying and baking the polyamide-imide resin insulating material A on an outer periphery of a conductor with a diameter of φ 0.8 mm, and subsequently, a 35 μm thick second insulating coating was further formed by applying and baking the polyamide-imide resin insulating material D, thereby making an insulated wire composed of an insulating covering layer having a total thickness of 40 μm.

Examples 1-6 and Comparative Examples 1-5 were evaluated as follows.

(1) Relative Dielectric Constant Measurement

A metal electrode was vapor-deposited on a surface of the insulated wire and capacitance between the conductor and the metal electrode was measured, and the relative dielectric constant was then calculated from the relation between an electrode length and an insulating coating thickness. In this regard, the capacitance was measured at 1 kHz using an impedance analyzer, and 3.0 or less of relative dielectric constant was judged as passed.

(2) Partial Discharge Inception Voltage (PDIV) Measurement

The insulated wire was cut in a length of 500 mm, ten specimens of twisted pair insulated wires were made, and an end processed portion was formed by removing the insulating coating to a position 10 mm from an end portion. After that, heat treatment was performed to dry in a constant temperature bath at 125° C. for 30 minutes, thereby forming the end processed portion. The specimens were left in a desiccator for 18 hours until the temperature returned to the room temperature. An electrode was connected to the end processed portion, and then, the measurement was conducted in an atmosphere at 23° C. with humidity of 50% while the voltage of 50 Hz was increased at 10-30 V/s up to the voltage at which 50 pC of discharge occurs 50 times in the twisted pair insulated wires (PDIV). The above was repeated 30 times, the average of each value was defined as the partial discharge inception voltage (PDIV), and 970 Vp or more was judged as passed.

(3) Breakdown Voltage (BDV) Measurement

The insulated wire was cut in a length of 500 mm, ten specimens of twisted pair insulated wires were made, and an end processed portion was formed by removing the insulating coating to a position 10 mm from an end portion. The end processed portion was connected to the electrode, the voltage was increased from 0V to 20V in the air, the voltage at which breakdown voltage occurred was defined as the breakdown voltage, and 18.0 kV or more was judged as passed.

(4) Flexibility

One coil was 5 rolls of insulated wire wound around a round bar (winding bar) with a smooth surface having a diameter 1-10 times that of the conductor, and the insulated wire equivalent to the amount of 5 coils were wound. The minimum winding diameter (d), when occurrence of cracks is not observed on the insulating coating at the time of winding, was defined as flexibility in no elongation, and 1 d was judged as passed. In addition, after the insulated wire was cut in a length of 2 m and one end thereof was fixed, the insulated wire was elongated in a length direction thereof in a state that the another end was gripped, until it was elongated 30% longer than the initial length (2.6 m). The insulated wire elongated 30% was evaluated in the same manner as the case of no elongation, and 1 d-2 d of minimum winding diameter was judged as passed.

(5) Reciprocating Abrasion

The number of the reciprocating abrasion was measured by a method conforming to JIS C 3003, and 1000 times or more was judged as passed.

(6) Twist Test

The insulated wire was fixed linearly to two clamps at a distance of 250 mm and the number of rotation at the time that the insulating coating was separated by the rotation of one clamp was measured, and 110 times or more was judged as passed.

(7) Adhesion Test

The insulated wire was fixed linearly to two clamps having a distance of 250 mm and the insulating coatings on two sides parallel to the length direction of the insulated wire were removed until reaching the conductor. Then, the number of rotation at the time that the insulating coating was separated by the rotation of one clamp was measured, and 70 times or more was judged as passed.

(8) Softening Temperature Measurement

Two 120 mm insulated wires were cut out, and the end processed portion was formed by removing the insulating coating on one end portion by using an Abisofix machine. In a state that the wires were crisscrossed and 6.9N (0.7 kgf) was loaded, after attaching to a softening resistance test machine, K7800 manufactured by Totoku Toryo Co., Ltd., an electrode was connected to the end processed portion, the temperature was increased at a rate of 0.1° C./min in a current passing state, the temperature when conducting electricity was measured as a softening temperature, and 430° C. or more was judged as passed.

From Table 1, it is understood that Examples 1-6 of the invention have the high partial discharge inception voltage, 970 Vp or more. Specifically, Examples 1-4 satisfy all of the above-mentioned evaluation criteria.

Although, in Examples 5 and 6, the insulating covering layer is formed by the first and second insulating coatings in the same manner as Examples 1-4, the heat resistance and the abrasion resistance are specifically inferior to Examples 1-4.

Therefore, when the characteristics other than the partial discharge inception voltage is taken into consideration, it is preferable that the polyamide-imide resin insulating material A is used as the first insulating coating and the polyamide-imide resin insulating material B or C is used as the second insulating coating. In other words, as are Examples 1-4, it is preferable that a multilayered insulating covering layer is formed by applying and baking the polyamide-imide resin insulating material A represented by the chemical formula 4 as the first insulating coating on the outer periphery of the conductor and then applying and baking the polyamide-imide resin insulating material B or C represented by the chemical formula 3 as the second insulating coating on the outer periphery thereof.

In contrast, Comparative Examples 1-5 do not satisfy the standard value of the partial discharge inception voltage. Although the embodiment and Examples of the invention have been described above, the invention according to claims is not to be limited to the above-mentioned embodiment and Examples. Further, please note that not all combinations of the features described in the embodiment and Examples are not necessary to solve the problem of the invention.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulated wire, comprising:
   a conductor; and
   an insulating covering layer formed on the periphery of the conductor and comprising two or more insulating coatings,
   wherein the insulating covering layer comprises a first insulating coating formed on the periphery of the conductor and a second insulating coating formed on the periphery of the first insulating coating,
   wherein the first insulating coating consists of a polyamide-imide resin material synthesized by reacting at least one of the group consisting of 4,4'-diphenylmethane diisocyanate (4,4'-MDI), 2,4'-diphenylmethane diisocyanate (2,4'-MDI) and 4,4'-diphenyl ether diisocyanate with trimellitic anhydride (TMA), the first insulating coating formed by applying to the periphery of the conductor and baking the polyamide-imide resin insulating material,
   the second insulating coating consists of a polyamide-imide resin insulating material obtained by reacting an imide group containing dicarboxylic acid with a diisocyanate, the imide group containing dicarboxylic acid being obtained by dehydration reaction of a diamine component consisting of at least one divalent aromatic diamine including three or more aromatic rings selected from the group consisting of 2,2-bis[4-(4-aminophenoxy)phenyl]propane, bis[4-(4-aminophenoxy)phenyl]sulfone, bis[4-(4-aminophenoxy)phenyl]ether, and 1,4-bis(4-aminophenoxy)benzene with TMA or benzophenone tricarboxylic acid as an acid using a solvent and the diisocyanate being at least one of the group consisting of 4,4'-diphenylmethane diisocyanate (MDI), 2,2-bis[4-(4-isocyanatephenoxy)phenyl]propane (BIPP), tolylene diisocyanate (TDI), xylylene diisocyanate, diphenyl sulfone diisocyanate and diphenyl ether diisocyanate, and
   the second insulating coating formed by applying to the periphery of the first insulating coating and baking the polyamide-imide resin insulating material, and wherein the insulating covering layer has a relative dielectric constant of 3 or less.

2. The insulated wire according to claim 1, wherein the second insulating coating has a film thickness of 30 μm or more.

3. The insulated wire according to claim 1, wherein the first insulating coating has a film thickness of 10 μm or less.

4. The insulated wire according to claim 1, wherein the insulated wire has a partial discharge inception voltage (VP) of at least 970 Vp.

5. The insulated wire according to claim 1, wherein the insulated wire is capable of being elongated 30% and then wound around a bar that is one to two times the diameter of the insulated wire without the insulating covering layer cracking.

6. The insulated wire according to claim 1, wherein the second insulating coating consists of a polyamide-imide resin insulating material obtained by reacting an imide group containing dicarboxylic acid with a diisocyanate, the imide group containing dicarboxylic acid obtained by the dehydration reaction of 2,2-[bis[4aminophenoxy)phenyl]propane or 1,4-bis(4-aminophenoxy)benzene, as a diamine consisting of a divalent aromatic diamine including three or more aromatic rings with TMA as an acid using an N-methyl-2-pyrrolidone as the solvent and xylene as an azeotropic solvent, and the diisocyanate consisting of 4,4'-diphenylmethane diisocyanate (MDI).

7. An insulated wire, comprising:
a conductor; and
an insulating covering layer formed on the periphery of the conductor and comprising two or more insulating coatings,
wherein the insulating covering layer comprises a first insulating coating formed on the periphery of the conductor and a second insulating coating formed on the periphery of the first insulating coating,
wherein the first insulating coating consists of a polyamide-imide resin material synthesized by reacting at least one of the group consisting of 4,4'-diphenylmethane diisocyanate (4,4'-MDI), 2,4'-diphenylmethane diisocyanate (2,4'-MDI) and 4,4'-diphenyl ether diisocyanate with trimellitic anhydride (TMA), the first insulating coating formed by applying to the periphery of the conductor and baking the polyamide-imide resin insulating material,
the second insulating coating comprising a polyamide-imide resin insulating material obtained by reacting an imide group containing dicarboxylic acid with a diisocyanate, the imide group containing dicarboxylic acid being obtained by dehydration reaction of a diamine component consisting of at least one divalent aromatic diamine including three or more aromatic rings selected from the group consisting of 2,2-bis[4-(4-aminophenoxy)phenyl]propane, bis[4-(4-aminophenoxy)phenyl]sulfone, bis[4-(4-aminophenoxy)phenyl]ether, and 1,4-bis(4-aminophenoxy)benzene with TMA or benzophenone tricarboxylic acid as an acid using an azeotropic solvent and the diisocyanate being at least one of the group consisting of 4,4'-diphenylmethane diisocyanate (MDI), 2,2-bis[4-(4-isocyanatephenoxy)phenyl]propane (BIPP), tolylene diisocyanate (TDI), xylylene diisocyanate, diphenyl sulfone diisocyanate and diphenyl ether diisocyanate, and
the second insulating coating formed by applying to the periphery of the first insulating coating and baking the polyamide-imide resin insulating material, and wherein the insulating covering layer has a relative dielectric constant of 3 or less.

8. An insulated wire, comprising:
a conductor; and
an insulating covering layer formed on the periphery of the conductor and comprising two or more insulating coatings,
wherein the insulating covering layer comprises a first insulating coating formed on the periphery of the conductor and a second insulating coating formed on the periphery of the first insulating coating,
wherein the first insulating coating comprises a polyamide-imide resin material synthesized by reacting at least one of the group consisting of 4,4'-diphenylmethane diisocyanate (4,4'-MDI), 2,4'-diphenylmethane diisocyanate (2,4'-MDI) and 4,4'-diphenyl ether diisocyanate with trimellitic anhydride (TMA), the first insulating coating formed by applying to the periphery of the conductor and baking the polyamide-imide resin insulating material,
the second insulating coating consists of a polyamide-imide resin insulating material obtained by reacting an imide group containing dicarboxylic acid with a diisocyanate, the imide group containing dicarboxylic acid being obtained by dehydration reaction of a diamine component consisting of at least one divalent aromatic diamine including three or more aromatic rings selected from the group consisting of 2,2-bis[4-(4-aminophenoxy)phenyl]propane, bis[4-(4-aminophenoxy)phenyl]sulfone, bis[4-(4-aminophenoxy)phenyl]ether, and 1,4-bis(4-aminophenoxy)benzene with TMA or benzophenone tricarboxylic acid as an acid using an azeotropic solvent and the diisocyanate being at least one of the group consisting of 4,4'-diphenylmethane diisocyanate (MDI), 2,2-bis[4-(4-isocyanatephenoxy)phenyl]propane (BIPP), tolylene diisocyanate (TDI), xylylene diisocyanate, diphenyl sulfone diisocyanate and diphenyl ether diisocyanate, and
the second insulating coating formed by applying to the periphery of the first insulating coating and baking the polyamide-imide resin insulating material, and wherein the insulating covering layer has a relative dielectric constant of 3 or less.

* * * * *